United States Patent
Ko et al.

(10) Patent No.: US 9,356,776 B2
(45) Date of Patent: May 31, 2016

(54) KEY MANAGING SYSTEM AND METHOD FOR SENSOR NETWORK SECURITY

(71) Applicant: ELECTRONICS AND TELECOMMUNICATIONS RESEARCH INSTITUTE, Daejeon (KR)

(72) Inventors: Seok Kap Ko, Gwangju (KR); Seung Chul Son, Gwangju (KR); Seung Hun Oh, Gwangju (KR); Byung Tak Lee, Gwangju (KR); Young Sun Kim, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 118 days.

(21) Appl. No.: 14/265,985

(22) Filed: Apr. 30, 2014

(65) Prior Publication Data

US 2015/0139425 A1 May 21, 2015

(30) Foreign Application Priority Data

Nov. 20, 2013 (KR) ........................ 10-2013-0141600

(51) Int. Cl.
*H04L 29/06* (2006.01)
*H04L 9/08* (2006.01)

(52) U.S. Cl.
CPC .............. *H04L 9/0819* (2013.01); *H04L 63/06* (2013.01); *H04L 63/08* (2013.01)

(58) Field of Classification Search
None
See application file for complete search history.

(56) References Cited

U.S. PATENT DOCUMENTS

| 5,850,443 | A * | 12/1998 | Van Oorschot | ....... H04L 9/0625 380/277 |
| 8,010,810 | B1 * | 8/2011 | Fitzgerald | ........... G06F 21/6209 380/267 |
| 2005/0154882 | A1 * | 7/2005 | Struik | ..................... H04L 63/08 713/160 |

(Continued)

FOREIGN PATENT DOCUMENTS

| KR | 10-2005-0068949 A | 7/2005 |
| KR | 10-0640003 B1 | 10/2006 |
| KR | 10-0737385 B1 | 7/2007 |

(Continued)

OTHER PUBLICATIONS

Laurent Eschenauer et al., "A Key-Management Scheme for Distributed Sensor Networks" CCS '02 Proceedings of the 9th ACM conference on Computer and communications security, pp. 41-47, Nov. 18, 2002.

*Primary Examiner* — Michael R Vaughan
(74) *Attorney, Agent, or Firm* — Rabin & Berdo, P.C.

(57) ABSTRACT

Disclosed are a key managing system and method for sensor network security. The key managing system includes a secret key transmitter configured to transmit a portion of a secret key map, stored in a node, to a correspondent node, and transmit the secret key map of the node to the correspondent node by using the transmitted portion of the secret key map and an authenticator configured to acquire a trust level of the correspondent node which indicates a ratio of a total size of the secret key map of the node and a size of the secret key map transmitted to the correspondent node, compare the acquired trust level of the correspondent node and a threshold value, and authenticate the correspondent node and a message acquired from the correspondent node by using the comparison result.

14 Claims, 6 Drawing Sheets

(56) References Cited

U.S. PATENT DOCUMENTS

2008/0084294 A1 4/2008 Zhiying et al.
2013/0042108 A1* 2/2013 Cancedda ............... H04L 9/28
    713/168

FOREIGN PATENT DOCUMENTS

| KR | 10-2008-0109538 A | 12/2008 |
| KR | 10-2009-0065745 A | 6/2009 |
| KR | 10-2011-0113379 A | 10/2011 |

* cited by examiner

KEY MANAGING SYSTEM AND METHOD FOR SENSOR NETWORK SECURITY

CROSS-REFERENCE TO RELATED APPLICATIONS

This application claims priority under 35 U.S.C. §119 to Korean Patent Application No. 10-2013-0141600, filed on Nov. 20, 2013, the disclosure of which is incorporated herein by reference in its entirety.

TECHNICAL FIELD

The present invention relates to a key managing system and method for sensor network security, and more particularly, to a method of generating, distributing, and updating a key necessary for security in a sensor network.

BACKGROUND

A wireless sensor network is being applied to various fields such as an environment control of intelligent buildings and factories, an automatic control of a production process, distribution management, articles and information management in hospitals, a remote check of patients' condition, etc. Recently, the wireless sensor network is core infra technology of a ubiquitous wireless network, and becomes increasingly more important.

A sensor network is a wired/wireless network configured with sensors that are ultralight and consume low power compared to a general computer network. The sensor network performs important roles such as collecting data and controlling equipment. Therefore, security is very important in a sensor network.

Examples of important issues of the wireless sensor network include authentication and security, in addition to miniaturizing of equipment, enhancing of a sensing ability, stable and fast routing, and power control. However, in the wireless sensor network, when sensor nodes accessing a base station desire to transmit/receive data, due to a feature of wireless transmission/reception, a malicious hacker may hack the transmitted/received data in the middle.

For security functions such as authentication and encryption, key exchange and management is preferentially required, various key management techniques for the sensor network are researched. To solve the security problems of the sensor network, technologies for key exchange, authentication, and encryption necessary for security in the sensor network are disclosed in Korean Patent Publication No. 10-2011-0113379 and Korean Patent Publication No. 10-2005-0068949.

Examples of a related art sensor network key managing method include a method that exchanges a key by using a plaintext at an initial step, a management method based on a network key and a group key in which a key to be used in a network or a group is previously set and used, and a method of using a reliable base station.

However, in the above-described related art methods, since a key to be used is exposed and transferred as a plaintext, a security attacker can easily hack the key. The above-described related art methods have a difficulty in that a secret key should be previously input to a sensor node. Furthermore, there is a problem in that an input device is limited for a lightened sensor network, but a master key of a base station should be input to a sensor node.

Among the related art key managing methods, as a method of performing a security connection without directly inputting a key to a node, there is Wi-Fi Protected Setup (WPS) technology. The WPS technology is a method in which when a user pushes a button, a key is transferred through message exchange. However, an attacker can intrude at a time when a user pushes a button.

The related art sensor network security key managing methods have the above-described problems, and moreover, security is weakened with time after installation. In detail, since a complicated encryption method cannot be used due to a characteristic of the sensor network, a low-level encryption method is used, and for this reason, a probability that a code is broken increases with time, causing security to be weakened with time.

SUMMARY

Accordingly, the present invention provides a key managing system and method in which a configuration of a sensor network is simple, a security of the sensor network is easily set, and the security is reinforced with time after network installation.

In one general aspect, a key managing system for a network includes: a secret key transmitter configured to transmit a portion of a secret key map, stored in a node, to a correspondent node, and transmit the other of the secret key map to the correspondent node by using the transmitted portion of the secret key map; and an authenticator configured to acquire a trust level of the correspondent node which indicates a ratio of a total size of the secret key map of the node and a size of the secret key map transmitted to the correspondent node, compare the acquired trust level of the correspondent node and a threshold value, and authenticate the correspondent node and a message acquired from the correspondent node by using the comparison result.

The secret key map may be a set of key sets including an index and a secret key, and different secret key maps for nodes of the network may be randomly generated when the network starts, or the secret key map may be generated based on an IDentification (ID) and address of the node and a seed of a time according to a secret key generation request.

The key managing system may further include a secret key manager configured to update the secret key map of the node after the correspondent node is authenticated.

The secret key manager may generate a public secret key recognized by the node and the correspondent node, encrypt the generated public secret key, generate an authentication code for authenticating the message of the node and the correspondent node based on the generated public secret key, or encrypt a query for authenticating the message of the node.

When the message is received from the correspondent node, the authenticator may transfer a query to another node of the network to authenticate the received message.

In another general aspect, a key managing method for a network include: performing an initial secret key exchange step of transmitting a portion of a secret key map, stored in a node of the network, to a correspondent node of the network; after the initial secret key exchange step, continuously transferring the secret key map of the node; acquiring a trust level of the correspondent node, based on a total size of the secret key map stored in the node and a size of the transmitted portion of the secret key map; when the acquired trust level is equal to or higher than a predetermined threshold value, authenticating the correspondent node and a message acquired from the correspondent node; and after the correspondent node is authenticated, when a certain rate or more of the total secret key map of the node is transferred to the correspondent node, changing the secret key map of the node to update trust.

The initial secret key exchange step may include continuously transferring the portion of the secret key map stored in the node through network communication for a predetermined time, generating and transferring a public secret key of the node and the correspondent node, or inserting the portion of the secret key map or the public secret key, which is generated in an initial state of transferring a secret key, into the correspondent node to transfer a secret key of the node to the correspondent node.

The initial secret key exchange step may include transferring the portion of the secret key map through network communication without being encrypted after the node of the network is installed or when a secret key transmission signal is received from a switch or a near field communication module equipped in the node.

The continuously transferring of the secret key map may include: periodically transmitting a next secret key to the correspondent node by using an initially transmitted secret key; and when a request is received from the correspondent node, rejecting the request, or transferring a query to other nodes of the network to authenticate the correspondent node.

The authenticating of the correspondent node may include: generating a message authentication code, based on a secret key map previously shared by the correspondent node; transmitting the generated authentication code and the message to the correspondent node; and comparing, by the correspondent node receiving the transmitted authentication code and message, a stored secret key map and the authentication code to authenticate the message received along with the authentication code.

The authenticating of the correspondent node may include: when a request message is received from the correspondent node, generating and transmitting a query message including content of a previously exchanged secret key map; receiving a response message to the query message from the correspondent node; checking whether the response message is normally composed; and when it is checked that the response message is normally composed, allowing and executing the request message.

The acquiring of a trust level may include: transmitting a secret key provision request message when the node is installed, for acquiring a trust level equal to or higher than a predetermined trust level within a predetermined time; and when the transmission of the secret key provision request message is completed, transferring the secret key map within a certain time, and the secret key map may be transferred within a predetermined time.

The updating of trust may include: changing the transmitted secret key map of the node with time; and notifying changed content of the secret key map transmitted to the correspondent node.

The updating of trust may include transmitting a secret key map, which is not transmitted by the node, to the correspondent node, updating the transmitted secret key map, and transferring the updated secret key map to the correspondent node.

Other features and aspects will be apparent from the following detailed description, the drawings, and the claims.

DETAILED DESCRIPTION OF EMBODIMENTS

In the present invention, provided are a key managing system and method in which a configuration of a sensor network is simple, a security of the sensor network is easily set, and by exchanging key maps of nodes, the security is reinforced with time after network installation. Accordingly, by gradually increasing trust between the nodes of the sensor network, security strength of the sensor network is enhanced with time.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, steps, elements, and/or components, but do not preclude the presence or addition of one or more other features, integers, steps, steps, elements, components, and/or groups thereof.

Hereinafter, embodiments of the present invention will be described in detail with reference to the accompanying drawings.

Figure 1:
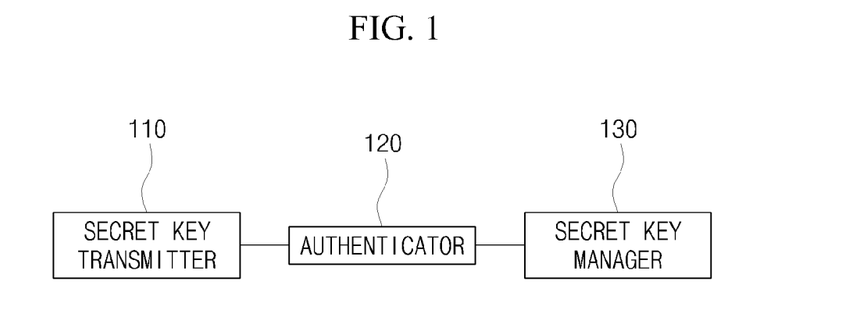
FIG. 1 is a block diagram illustrating a key managing system according to an embodiment of the present invention.

FIG. 1 is a block diagram illustrating a key managing system 100 according to an embodiment of the present invention.

In an embodiment of the present invention, network sensor nodes exchange their secret keys at intervals, and code, node, and message authentication is performed by using the exchanged secret keys (security keys). Through such a method, security is easily set at an initial step, and security strength of a sensor network is reinforced with time.

The key managing system 100 according to an embodiment of the present invention includes a secret key transmitter 110, an authenticator 120, and a secret key manager 130. The secret key transmitter 110 transmits a portion of a secret key map, stored in a node, to a correspondent node, and then transmits the secret key map of the node to the correspondent node by using the transmitted portion of the secret key map.

The authenticator 120 acquires (or accumulates) a trust level of the correspondent node which indicates a ratio of a total size of the secret key map of the node and a size of the secret key map transmitted to the correspondent node, compares the acquired (accumulated) trust level of the correspondent node and a threshold value, and authenticates the correspondent node and a message acquired from the correspondent node by using the comparison result. Also, when a message is received from the correspondent node at an initial secret key map exchange step, the authenticator 120 transfers a query to another node of the sensor network to receive a message, and authenticates the received message.

The secret key manager 130 authenticates the correspondent node, and then updates the secret key map of the node. In an embodiment, each of nodes configuring the sensor network has a secret key map. The secret key map is a set of key sets including an index and a secret key. When a map is configured as an arrangement type, the index may not separately be specified, and a position of the secret key may indicate the index. Furthermore, the secret key manager 130 generates a public secret key that is recognized by the node and the correspondent node, encrypts the generated public secret key, generates an authentication code for authenticating the message of the node and the correspondent node on the basis of the generated public secret key, or encrypts a query for authenticating the message of the node.

Figure 2:
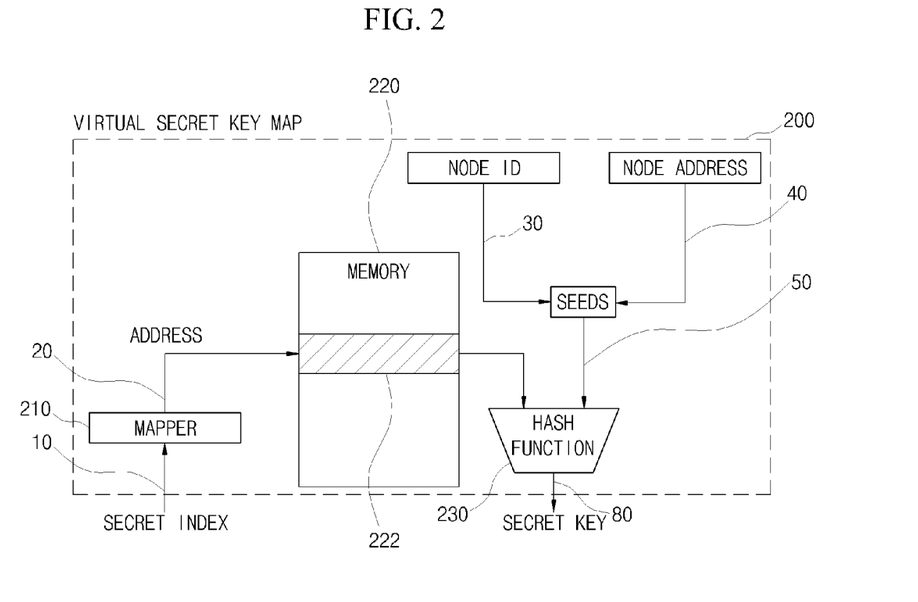
FIG. 2 is a diagram illustrating an example of generating a secret key map by using a hash function according to an embodiment of the present invention.

FIG. 2 is a diagram illustrating an example of generating a secret key map by using a hash function according to an embodiment of the present invention.

In an embodiment, a secret key map may be random when a node starts, or may be stored in a storage space and used. Furthermore, in a sensor node of which a memory is insufficient, a virtual secret key map 200 may be generated by using a nonvolatile memory area. The nonvolatile memory area may be an area that stores a program code, and may have a pseudorandom type.

In another embodiment, in order for different secret key maps to be generated for respective nodes, a seed 50 may be generated by using content of a nonvolatile memory area 222, an IDentification (ID) 30 of a node, an address 40 of the node, and a time, and an arithmetic step of the seed 50 may be performed by using a hash function 230, thereby generating a secret key 80 according to a request.

An step of generating a virtual secret key map 200 by using the nonvolatile memory area 222 will be described in detail with reference to FIG. 2. In the present embodiment, a secret key map is not stored in a memory 220, and when there is a request of a secret index 10, the secret key 80 is calculated with reference to a memory address 20 at a location corresponding to the secret index 10. In detail, when the request of the secret index 10 is input to a mapper 210, the mapper 210 maps the secret index 10 to the memory address space 222. Here, data stored in the memory address space 222 is one of inputs of the hash function 230. In this case, a seed 60 indicating the node ID 30, the node address 40, and a time is another input of the hash function 230 according to a secret key generation request. The hash function 230 encrypts the two inputs to generate the secret key 80.

Generally, since a hash function includes an irreversible one direction function, it is unable to reproduce the original text from a hash value. Also, it is very difficult to generate different pieces of data having the same hash value. By using such characteristics, the hash function is applied to an encryption assistance means for communication, user authentication, and a digital signature.

Figure 3:
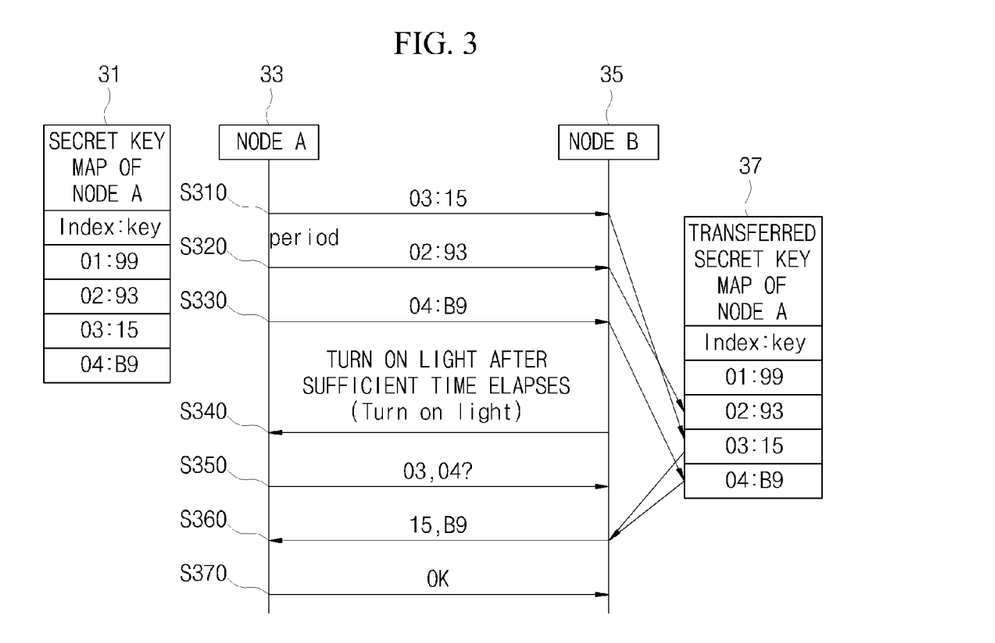
FIG. 3 is a diagram illustrating an step in which a node of a sensor network according to an embodiment of the present invention and a correspondent node share a secret key map.

Hereinafter, an step of sharing a secret key map between nodes of the sensor network will be described in detail with reference to FIG. 3. FIG. 3 is a diagram illustrating an step in which a node of a sensor network according to an embodiment of the present invention and a correspondent node share a secret key map.

As illustrated in FIG. 3, in the sensor network, when a node A 33 meets another node B 35, the node A 33 transfers an arbitrary or sequential one row (i.e., an index and a secret key) of a secret key map 31 of the node A to the other node B 37, in step S310.

Subsequently, in steps S320 and S330, the node A 33 transfers another index and secret key to the other node 35 at certain intervals. Then, when a certain time elapses, all or a portion of the secret key map of the node A 33 are/is transferred to the other node B 35.

Subsequently, when the node B 35 regarded as a correspondent side (which has communicated for a certain time) sends an important request in step S340, the node A 33 transfers a query of a previously transferred secret key for check, in step S350.

The node B 35 receiving a query message sends a response message by using the secret key map which has been received from the node A 33 for a certain time, in step S360.

The node A 33 receiving the response message compares the response message with its own secret key to determine whether there is a match therebetween, and performs content requested by the node B 35, in step S370. Such an step is identically performed by the node B 35. That is, when necessary, the node B 35 transfers its own secret key map to the node A 33 at intervals.

In an embodiment, as illustrated in FIG. 3, for example, the node A 33 is a light switch sensor, and the node B 35 is a gateway node. It is assumed that the node A 33 has a secret key map having four rows. In 01:99 of FIG. 3, 01 denotes an index, and 99 denotes a secret key. A length of the secret key may be changed depending on strength of security, and a size of the index may be appropriately set depending on a memory space and desired security strength.

When the node A 33 meets the node B 35, the node A 33 transfers an arbitrary row of the secret key map 31 of the node A to the other node B 37. As illustrated in FIG. 3, the node A 33 transfers a secret key 15 of a 03rd index, in step S310. Subsequently, the node A 33 transfers a secret key 93 of a 02nd index, in step S320. Subsequently, the node A 33 transfers a secret key 99 of a 04th index, in step S330.

The node B 35 generates a secret key map 37 of a correspondent node (i.e., the node A 33) by using messages which are received in steps S310, S320 and S330, and memorizes the secret key map 37. The node A 33 gradually transfers its own secret key map 31 to the correspondent node B 35 at intervals. Then, when a sufficient time elapses, the node B 35 receives and memories most contents of the secret key map 31.

After a sufficient time elapses, the node B 35 sends a command message "turn on light" to the node A 33, in step S340. The node A 33 sends a query message "03,04?" including two arbitrary indexes of the secret key map 31 so as to check the command message being generated by the node B 35, in step S350. The node B 35 sends secret keys "15" and "B9" of an index included in the query message by using the secret key map 37 of the node A 33 which has been received for a certain time, in step S360. Since the query message includes an index "03" and an index "04", the node B 35 adds the secret keys "15" and "B9" of the respective indexes into a response message. The node A 33 receiving the response message checks whether the received response message is a normal response message, with reference to its own secret key map 31, and when the received response message is a normal response message, the node A 33 executes a command of the requested command message (for example, turn on light), in step S370.

Through the above-described steps, the nodes exchange the secret key map at intervals, thereby maturing a trust relationship and performing communication.

In an embodiment, through the above-described steps, the nodes exchange the secret key map at intervals, thereby maturing a trust relationship and performing communication. The above-described details are merely an example for aiding understanding, and a supplement is needed for actual application.

Secret key exchange messages of the sensor network may be encrypted in order for a malicious node not to know the secret key exchange messages. In a case of a response to a query for node check, a secret key may be prevented from being exposed by using the hash function. Table 1 shows message conversion-related signs for message conversion for security.

TABLE 1

| Sign | Explanation |
|---|---|
| H(m) | Change a message "m" by using a hash function |
| {m}_k | Encrypt a message "m" with an encryption key "k" |
| K_a_i | A secret key of an index "i" of a node "a" |
| a->b:m | A node "a" sends a message "m" to a node "b" |

In an embodiment of the present invention, an algorithm for an encryption scheme or the hash function itself is not defined. The existing encryption scheme or hash function may be used, or a simple scheme such as an exclusive-OR step or an addition step may be used.

Figure 4:
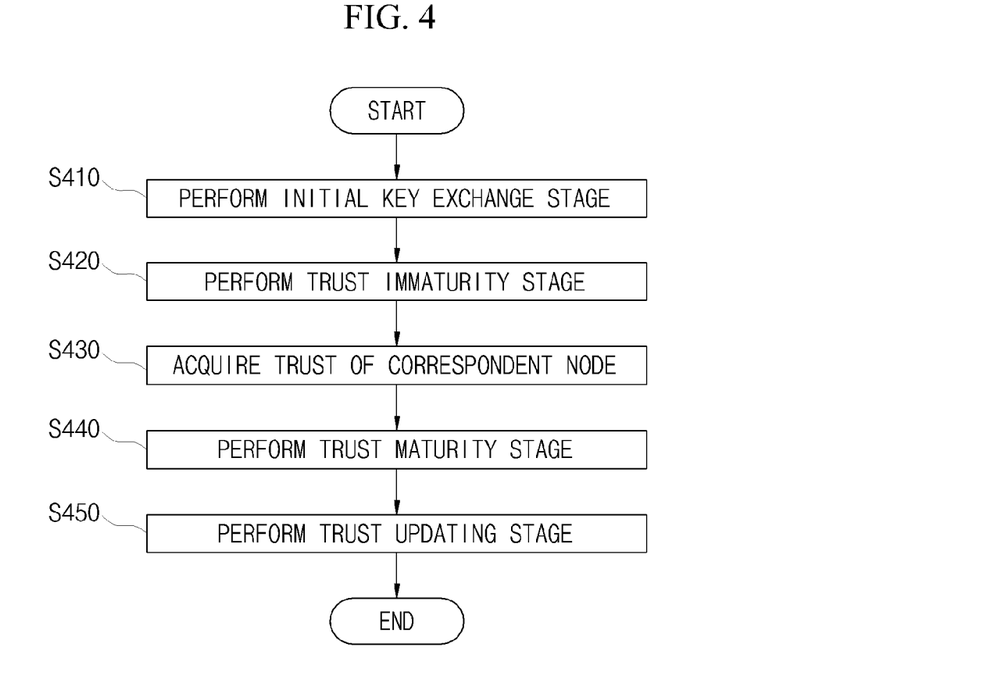
FIG. 4 is a flowchart illustrating an step of the key managing system according to an embodiment of the present invention.

FIG. 4 is a flowchart illustrating an step of the key managing system according to an embodiment of the present invention.

According to another embodiment of the present invention, a secret key managing method of the sensor network includes: an initial key exchange step S410 that transmits a portion of a secret key map stored in a sensor network node to a correspondent node of the sensor network; a trust immaturity step S420 that, after the initial key exchange step, continuously transfers the secret key map of the node, and gradually increases a trust of the correspondent node on the basis of a total size of a secret key map stored in the node and a size of the transmitted portion of the secret key map; a trust acquisition step S430 that acquires a trust of the correspondent node; a trust maturity step S440 that, when the acquired trust is equal to or greater than a predetermined value, authenticates the correspondent node and a message acquired from the correspondent node; and a trust updating step S450 that, after the correspondent node is authenticated, when a certain rate or more of the total secret key map is transferred to the correspondent node, changes the secret key map of the node to update trust.

Figure 5:
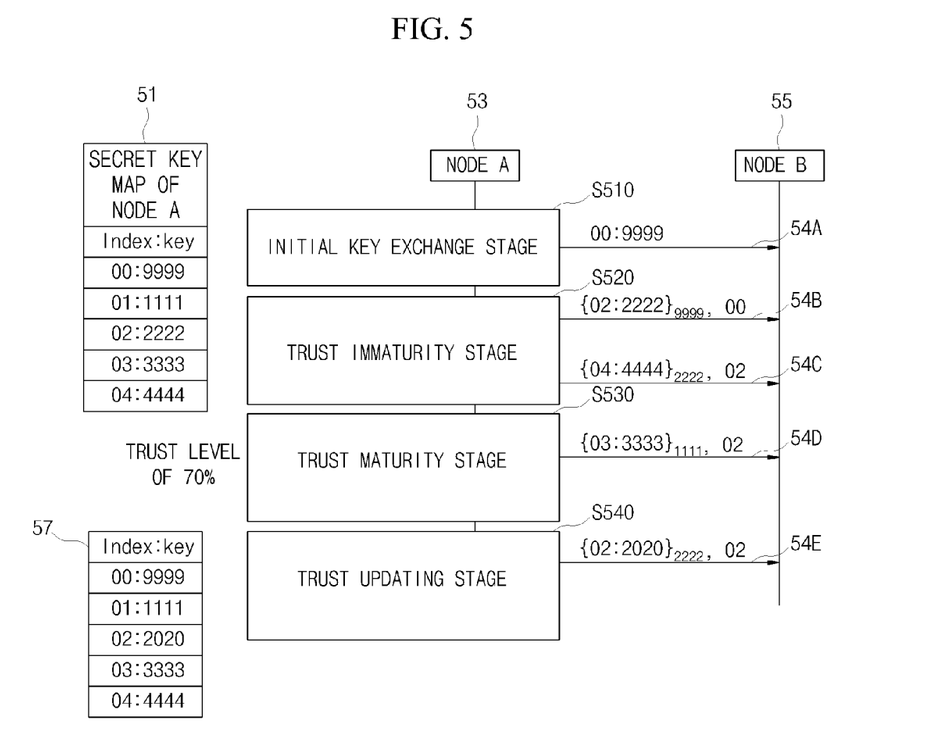
FIG. 5 illustrates a detailed example of secret key map exchange in each step according to an embodiment of the present invention.

FIG. 5 illustrates a detailed example of secret key map exchange in each step according to an embodiment of the present invention.

Four steps, such as an initial key exchange step, a trust immaturity step, a trust acquisition step, a trust maturity step, and a trust updating step, will now be described in detail with reference to FIG. 5.

I. Initial Key Exchange Step

In an initial key exchange step S510, a portion of a secret key map of a node is transferred to a correspondent node. As illustrated in FIG. 5, for example, a node A 53 transfers a secret key "00:9999" 54A of a 00th index to a node B 55, in step S510. In step S510, the node A 53 transfers a portion of the secret key map stored in the node A 53 through sensor network communication, or generates and transfers a public secret key of the node A 53 and node B 55, or inserts a portion of the secret key map or the public secret key (which is generated in an initial state of transferring a secret key) into the node B 55 to transfer the secret key of the node A 53 to the node B 55.

In an embodiment, there are three methods of transferring an initial secret key. One or more methods may be used depending on a sensor network installation environment.

A first method of exchanging an initial key according to an embodiment of the present invention is a method that transfers a sensor network communication medium without encrypting a portion of the secret key map.

In the first initial key exchange method, when a correspondent node is found within a certain time after node installation is completed, an initial key may be transferred, and after the node installation is completed, when an installer/operator inputs a separate signal to a node, a portion of the secret key map is transferred through the sensor network communication medium for a certain time without being encrypted. In this case, the separate signal input to the node may be used as a separate communication network means such as a button switch attached to the node, infrared communication, Near Field Communication (NFC), and Radio Frequency Identification (RFID). In the initial key exchange step S510, for example, the node A 53 transmits a secret key "0" of an index of the node A 53 to the node B 55 (a→b: K_a_0), thereby transmitting the initial key for exchange of the secret key map.

A second initial key exchange method according to an embodiment of the present invention is a method that generates a public key available by the nodes A and B by using a technique such as Diffie-Hellman.

In the Diffie-Hellman technique that is an initial secret key encryption algorithm, a public key is composed of one integer and one prime number and is shared by a correspondent side immediately before communication, both communication sides have different security key dedicated numbers, and a common encryption key numerical value is calculated by using the public key, the security key dedicated numbers, and a numerical value of a public key. For example, in an step of generating a public key of the nodes A and B of the sensor network, the node A changes a secret key of an index "0" of the node A by using the hash function to transmit the changed secret key to the node B (a→b: H(K_a_0)), and the node B changes a secret key of an index "0" of the node B by using the hash function to transmit the changed secret key to the node A (b→a: H(K_b_0)). When message exchange between the nodes A and B is completed, a public key for transmission of an initial key between the nodes A and B is generated.

In an embodiment, a public key such as H(K_b_0) ^K_a_0=H(K_a_0) ^K_b_0 is generated depending on a transmitted message. A Diffie-Hellman public key generating method is vulnerable to a man-in-the-middle attack, but is effective because it is assumed that there is no security attacker in an initial step of installing the sensor network.

A third method of exchanging an initial key according to an embodiment is a method that inserts a portion of a secret key map or an initial public key into a correspondent node by using a separate communication means (for example, NFC, infrared communication, visible light communication, or voice communication).

Figure 6:
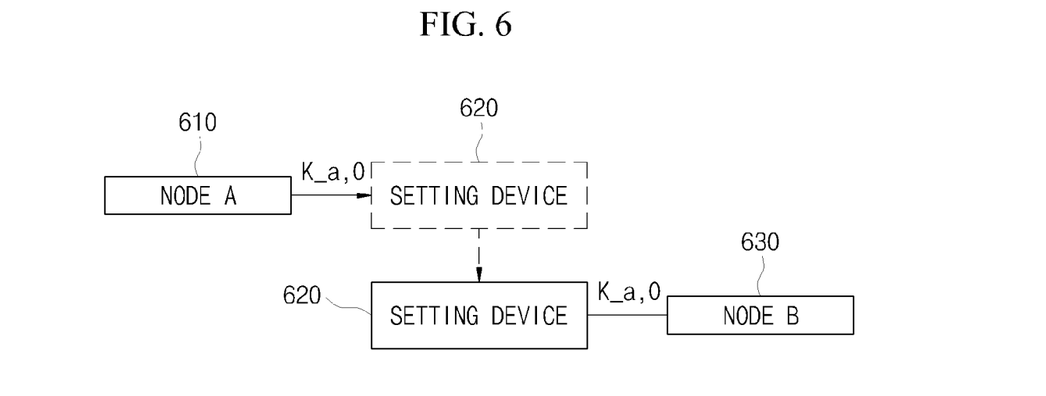
FIG. 6 is a diagram for describing an step in which an initial public key is inserted into a correspondent node by using a separate communication means according to an embodiment of the present invention.

An step of inserting an initial public key into a correspondent node by using a separate communication means will be described in more detail with reference to FIG. 6. As illustrated in FIG. 6, in order to transfer the initial public key to the correspondent node through the separate communication means, a node A 610 first transfers a portion "K_a_0" of an initial secret key map to a setting device 620 through visible light communication, and the setting device 620 transfers the data "K_a_0" to a node B 630. In FIG. 6, a portion illustrated as a solid-line arrow denotes the visible light communication, and a portion illustrated as a dotted-line arrow denotes a movement of the setting device 620.

II. Trust Immaturity Step S520

The trust immaturity step S520 according to an embodiment is a step that continuously transfers a secret key map of a node, and includes: an step that periodically transmits a next secret key to the correspondent node by using an initially transmitted secret key; and an step that, when a request is received from the correspondent node, rejects the request, or transfers a query to other nodes of the sensor network to authenticate the correspondent node. Hereinafter, an step of continuously transferring a secret key map to a correspondent node in the trust immaturity step will be described with a detailed example.

The trust immaturity step S520, which is a second step of secret key exchange, is a step that continuously transfers a secret key map to a correspondent node by using a key that has been exchanged in the initial key and trust maturity step. The node A initially transfers another key "K_a, n" by using an initial key (a→b: {n, K_a_n}_(K_a_0), 0). When an arbitrary or sequential one index of an already transmitted key is referred to as "i", and an index of a new key is referred to as "j", a next key "K_a_j" is transferred as follows (a→b: {j, K_a_j}_(K_a_i), i).

That is, the next key "K_a_j" and the index "j" of the new key are encrypted with an already transmitted key "K_a_i". An index "i" of the encrypted key is added into a message, which is transferred. By using a secret key "K_a_j" of the index "i" in an already transmitted key map, the node B receiving the message decrypts and stores the index "j" of the encrypted new key and the secret key "K_a_j".

For example, as illustrated in FIG. 5, the node A 53 transfers another key "54B" by using the initial key "00:9999" 54A in step S520. In addition, the node A 53 transmits another key "54C" to the node B 55 by using a previously transferred key 54B.

The above-described step is not performed at one time but is gradually repeated for a certain time to transfer a secret key map to a correspondent side. It is assumed that trust between two nodes is not sufficiently matured until before a predetermined time for exchanging the secret key map elapses.

When an important request is received from a correspondent side in the trust immaturity step, a command corresponding to the request may be immediately performed without a query or rejected according to an operating policy.

In an embodiment, when a request message is received in the trust immaturity step, a node may transfer a query to other nodes to authenticate a correspondent node. An step of performing authentication by transferring a query to other nodes, according to an embodiment of the present invention, will be described as follows.

When the node B sends a request message to the node A (b→a: m_req), since the node A cannot yet trusted the node B, the node A sends a query message to a node C having a trust relationship with the node A (a→c: ASK: m_req, b, r1, i). Here, i denotes one of secret key indexes of the node A, and r1 is an arbitrary value. For example, when the node C has a trust relationship with the node B, the node C sends a message, which checks whether the node B sent the request message, to the node B (c→b: Query: m_req, r2, j). Here, j denotes one of secret key indexes of the node C, and r2 is an arbitrary value. The node B transfers a check response by using a secret key map of the node C (b→c: H(K_c_j, r2)). The node C receiving the check response transfers a check response to the query message received from the node A (c→a: OK, H(r1, K_a_i)).

In an embodiment, when a trust level between two nodes is a predetermined trust level, a step subsequent to the trust immaturity step may be performed. In an embodiment of the present invention, a trust level is expressed as a ratio of a total size of a secret key map and a transmitted size of the secret key map as expressed in Equation (1):

$$\text{trust level} = \text{total size of secret key map} / \text{transmitted size of secret key map} \quad (1)$$

III. Trust Maturity Step S530

The trust maturity step S530 according to an embodiment is a step that continuously maintains an exchange of a secret key map in the sensor network, and when an important request is received from a correspondent node, authenticates a request message and a node by performing a query step. FIG. 5 shows an example in which a trust level for proceeding the trust immaturity step to the trust maturity step is 70%. For example, in step S530, the node A 53 may transmit another key 54D of the secret key map 51 of the node A 53 to the node B 55, thereby satisfying a predetermined trust level.

IV. Trust Updating Step S540

The trust updating step S540 according to an embodiment includes: an step, which changes a transmitted secret key map of a sensor network node with time, and an step that notifies changed content of the secret key map transmitted to a correspondent node.

Furthermore, the trust updating step S540 includes an step that transmits a secret key map, which is not transmitted by a node, to the correspondent node, updates the transmitted secret key map, and transfers the updated secret key map to the correspondent node. The trust updating step S540 includes an step that, when all or most portions of the secret key map are transferred to a correspondent side, changes the secret key map. In the step, a length of a secret key may be changed, and the secret key map may more increase in length. In the trust updating step, a node changes its own secret key map with time, and notifies a correspondent node of the changed content. For example, when a new secret key of an index "j" is "K'_a,j", and an index of an encrypting key is "i", a secret key updating message may be transferred in the following forms. The index "i" of the encrypting key may be the same as the index "j" of an updating key (a→b: {j, K'_a, j}_(K_a,i), i).

For example, in the trust updating step S540 of FIG. 5, a secret key of an index "02" included in the secret key map 51 of the existing node A 53 is updated from 2222 to 2020, and the node A 53 transmits an updated secret key 54E to the node B 55. In FIG. 5, it can be seen that a secret key of an index "02" of a secret key map 57 of the updated node A 53 is updated to 2020.

The trust updating step may not be performed depending on an environment of the sensor network or a sensor node. Furthermore, by transferring a secret key map (which is not yet transmitted) to the node B 55, the existing secret key map may be updated, and the updated secret key map may be transferred.

In another embodiment, a node authenticating step includes: an step that generates a message authentication code on the basis of a secret key map previously shared by a correspondent node; an step that transmits the generated authentication code and the message to the correspondent node; and an step in which the correspondent node receiving the transmitted authentication code and message compares a stored secret key map and the authentication code to authenticate the message received along with the authentication code. For convenience of understanding, an step of authenticating a node according to an embodiment of the present invention will be described at the following four steps with reference to FIG. 7.

Figure 7:
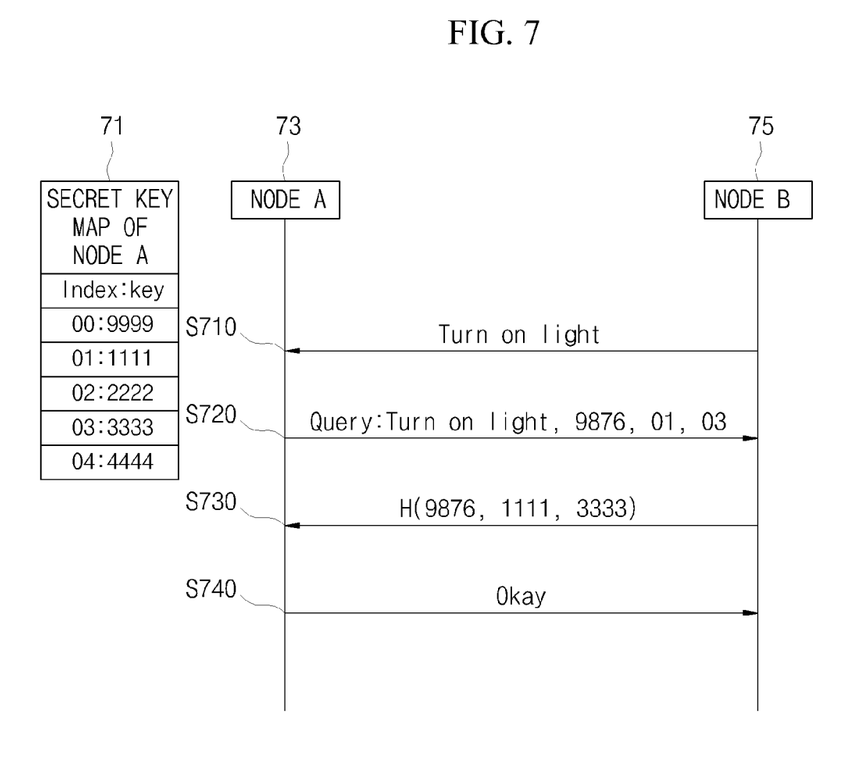
FIG. 7 illustrates an example in which a correspondent node transmits a request message according to an embodiment of the present invention.

FIG. 7 illustrates an example in which a correspondent node transmits a request message according to an embodiment of the present invention.

In an embodiment of the present invention, a step that generates an authentication code to authenticate a correspondent node includes: an step that generates a message authentication code on the basis of a secret key map previously shared by the correspondent node; an step that transmits the generated authentication code and the message to the correspondent node; and an step in which the correspondent node receiving the transmitted authentication code and message compares a stored secret key map and the authentication code to authenticate the authentication code and the message.

As illustrated in FIG. 7, in step S710, a node B 75 first transmits a request message "m_req" (for example, a message "turn on light") to a node A 73 (b→a: m_req).

Subsequently, in step S720, the node A 73 transmits a query message 74 including a random value "r" and one or more (i, j) of transmitted indexes included in a secret key 71 of the node A 73 (a→b: Query: m_req, r, i, j).

In step S730, the node B 75 receiving the query message 74 combines secret keys "K_a_i" and "K_a_j" of indexes included in the query message and the random value "r" to effect conversion to generate a response message by using the hash function (b→a: H(r, K_a_i, K_a_j)).

Finally, the node A 73 determines whether content of the response message matches a hash function value that is calculated by using a secret key map of the node A 73, and when there is a match therebetween, the node A 73 performs a requested step (a→b: m_ok), in step S740.

FIG. 7 illustrates an step in which the node A 73 transfers the secret key map to the node B 75. In another embodiment, an step in which the node A 73 and the node B 75 simultaneously transfer their own secret key maps may be performed.

In an embodiment, a method of exchanging a secret key map through mutual authentication may use a secret key map of a correspondent side when transferring a new secret key map.

By using a secret key "K_b_x" of an index "x" of the node B, the node A may transfer a secret key "K_a_j" of its own next index "j" to effect mutual authentication, and exchange a secret key map (a→b: {j, K_a_j}_(K_b_x), x). That is, each node may perform mutual authentication, and exchange the secret key map.

Figure 8:
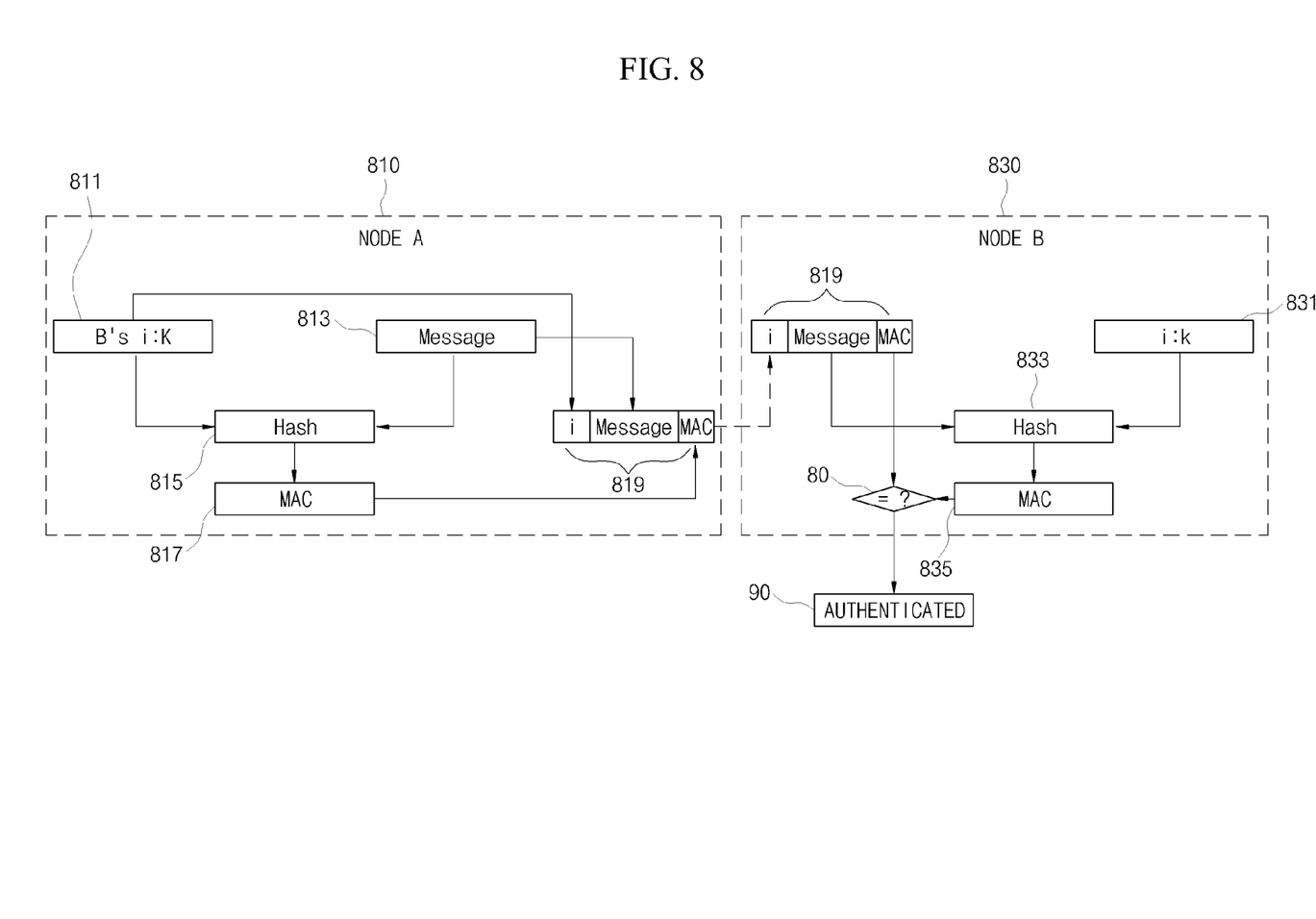
FIG. 8 is a diagram illustrating an example of performing message authentication by using an exchanged secret key map according to another embodiment of the present invention.

FIG. 8 is a diagram illustrating an example of performing message authentication by using an exchanged secret key map according to another embodiment of the present invention.

As illustrated in FIG. 8, when transmitting a message for authenticating a message by using a previously transferred secret key map, a node A 810 adds an index "i" into a head region of a message 813 which is to be transmitted to the node B 830, by using a previously shared secret key map 811 of the node B (for example, a secret key "k" of the index "i" of the previously shared secret key map of the node B).

The node A 810 compresses (message digests) the previously shared secret key map 811 "K_b_i" of the node B and the message 813, which is to be transmitted to the node B 830, by using a hash function 815 to generate a Message Authentication Code (MAC) 817. The MAC 817 is included in a tail region of the message 813 which is to be transmitted to the node B 830.

That is, an authentication message 819 which is to be transmitted to the node B 830 has a data structure in which the index "i" is included in a data head region, and the MAC 817 is included in a data tail region. The node A 810 transmits the authentication message 819 to the node B 830.

The node B 830 receiving the authentication message 819 compares an MAC 835 (which is obtained by performing a hash step 833 on the secret key map 831 of the node B 830) and the MAC included in the authentication message 819 received from the node A 810 to determine whether the MACs are the same, in step 80, and performs message authentication by using the comparison result. For example, when the MACs are the same as the comparison result, the node B 830 authenticates the node A 819.

The above-described query-response step may be simplified by using the message authentication. In the above-described example, in transmitting a request message "turn on light", when transmitting the request message with an MAC added thereinto, the node A may authenticate the MAC to immediately determine whether to perform processing of a request without the query-response step.

In another embodiment, the sensor network is established, and then, in order to more quickly form a trust relationship, an installer may provide a separate signal to two sensor nodes to enable a secret key map to be temporarily transferred quickly. Each of the sensor nodes transfers the secret key map when the separate signal and a secret key provision request message from a correspondent side are all received within a predetermined time. The secret key provision request message is checked by using an authentication code or performing a query response step, and is allowed.

Figure 9:
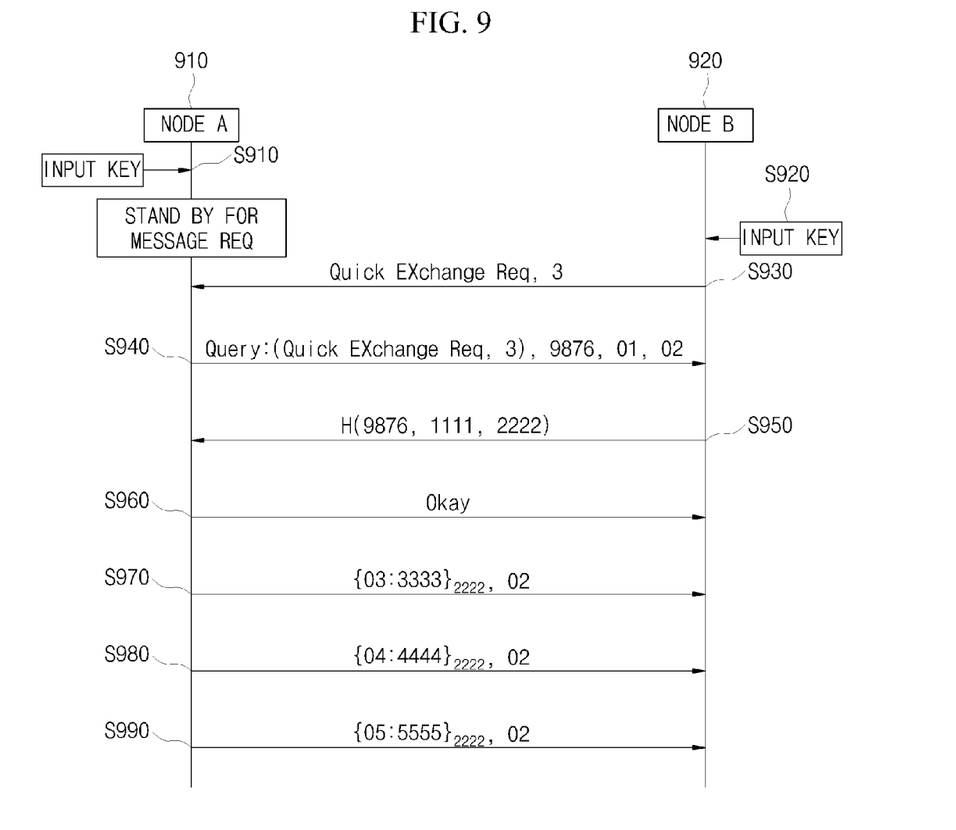
FIG. 9 is a signal flowchart illustrating an step in which an installer pushes setting switches respectively attached to nodes A and B to mature a fast trust relationship between the nodes according to another embodiment of the present invention.

FIG. 9 is a signal flowchart illustrating an step in which an installer pushes setting switches respectively attached to nodes A and B to mature a fast trust relationship between the nodes according to another embodiment of the present invention.

In an embodiment, an installation signal may be transferred by using a communication means such as the Internet, in addition to a physical setting switch.

As illustrated in FIG. 9, in an embodiment, an installer provides a separate signal to a node A 910 for quick exchange of a secret key map in step S910, the node A 910 stands by for receiving a signal 91 that requests the quick exchange.

When the installer inputs a key to a node B 920 for the quick exchange of the secret key map in step S920, the node B 920 transmits a signal (Quick EXchange Req, 3), which requests the quick exchange, to the node A 910 in step S930, and the node A 910 receiving the a quick exchange request signal 91 transmits a query signal (Query: Quick Exchange Req, 9876,01,02) therefore in step S940. Here, 9876 is a random value, and 01 and 02 are indexes of a secret key map of the node A 910. The node B 920 transmits a response signal 93 (H(9876,1111,2222)) to the query signal to the node A 910 in step S950.

When the received response signal 93 (H(9876,1111, 2222)) matches a secret key of an index included in the secret key map of the node A 910, the node A 910 trusts the node B 920 in step S960, and then transmits an index included in the secret key map to the node B 920.

As illustrated in FIG. 9, in an embodiment, the node A 910 transfers one of secret keys of the index included in the secret key map to the node B 920 in step S970, and then, the node A 910 transfers the other one of the secret keys of the index included in the secret key map to the node B 920 in step S980. Subsequently, the node A 910 transfers the other one of the secret keys of the index included in the secret key map to the node B 920 in step S990.

The present invention using the above-described secret key map may be applied to the existing security communication methods such as Transport Layer Security (TLS) and DTLS. However, the existing TLS supports, as a key exchange technique, only some well-known techniques such as a Rivest Shamir Adleman (RSA) technique and a Diffie-Hellman technique. Therefore, a key exchange method applied to an embodiment of the present invention may be added. An encryption technique is assumed as using the existing symmetric key technique, and a TLS handshake step of transmitting an index of a used secret key does not need exchange.

The present invention gradually reinforces security between two nodes with time, but the above-described method may be used when it is required to quickly reinforce security depending on user and network conditions.

According to the present invention, provided are the key managing system and method in which a configuration of the sensor network is simple, a security of the sensor network is easily set, and by exchanging the key maps of the nodes, the security is reinforced with time after network installation. Accordingly, by gradually increasing trust between the nodes of the sensor network, security strength of the sensor network is enhanced with time.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A key managing system for a sensor network including first and second sensor nodes, the key managing system comprising:
   a hardware transmitter configured to
      transmit a portion of a secret key map of the first sensor node to the second sensor node, and
      transmit another portion of the secret key map to the second sensor node using a secret key in the transmitted portion of the secret key map, and
   a hardware processor configured to execute program instructions, to thereby provide functions of an authenticator configured to
      acquire a trust level of the second sensor node that corresponds to a ratio of a total size of the secret key map of the first sensor node and a size of the transmitted portion of the secret key map,
      compare the acquired trust level of the second sensor node and a threshold value, and
      authenticate the second sensor node and a message acquired from the second sensor node using a result of the comparison.

2. The key managing system of claim 1, wherein,
   the secret key map includes a plurality of key sets each including an index and a secret key, and
   the secret key map is randomly generated when the sensor network starts, or generated based on an IDentification (ID) and an address of the first sensor node and a seed of a time according to a secret key generation request.

3. The key managing system of claim 1, further comprising a secret key manager configured to update the secret key map of the first sensor node after the second sensor node is authenticated.

4. The key managing system of claim 3, wherein the secret key manager
   generates a public secret key recognized by the first sensor node and the second sensor node,
   encrypts the generated public secret key, and
   generates an authentication code for authenticating the message based on the generated public secret key, or encrypts a query for authenticating the message.

5. The key managing system of claim 1, wherein
   the sensor network further includes a third sensor node, and
   when the message is received from the second sensor node, the authenticator transfers a query to the third sensor node to authenticate the received message.

6. A key managing method for a network, the key managing method comprising:
   performing an initial secret key exchange step of transmitting a portion of a secret key map, stored in a node of the network, to a correspondent node of the network;
   after the initial secret key exchange step, continuously transferring the secret key map of the node;
   acquiring a trust level of the correspondent node, based on a total size of the secret key map stored in the node and a size of the transmitted portion of the secret key map;
   when the acquired trust level is equal to or higher than a predetermined threshold value, authenticating the correspondent node and a message acquired from the correspondent node; and
   after the correspondent node is authenticated, when a certain rate or more of the total secret key map of the node is transferred to the correspondent node, changing the secret key map of the node to update trust.

7. The key managing method of claim 6, wherein the initial secret key exchange step comprises continuously transferring the portion of the secret key map stored in the node through network communication for a predetermined time, generating and transferring a public secret key of the node and the correspondent node, or inserting the portion of the secret key map or the public secret key, which is generated in an initial state of transferring a secret key, into the correspondent node to transfer a secret key of the node to the correspondent node.

8. The key managing method of claim 6, wherein the initial secret key exchange step comprises transferring the portion of the secret key map through network communication without being encrypted after the node of the network is installed or when a secret key transmission signal is received from a switch or a near field communication module equipped in the node.

9. The key managing method of claim 6, wherein the continuously transferring of the secret key map comprises:
   periodically transmitting a next secret key to the correspondent node by using an initially transmitted secret key; and when a request is received from the correspondent node, rejecting the request, or transferring a query to other nodes of the network to authenticate the correspondent node.

10. The key managing method of claim 6, wherein the authenticating of the correspondent node comprises:
generating a message authentication code, based on a secret key map previously shared by the correspondent node;
transmitting the generated authentication code and the message to the correspondent node; and
comparing, by the correspondent node receiving the transmitted authentication code and message, a stored secret key map and the authentication code to authenticate the message received along with the authentication code.

11. The key managing method of claim 6, wherein the authenticating of the correspondent node comprises:
when a request message is received from the correspondent node, generating and transmitting a query message including content of a previously exchanged secret key map;
receiving a response message to the query message from the correspondent node;
checking whether the response message is normally composed; and
when it is checked that the response message is normally composed, allowing and executing the request message.

12. The key managing method of claim 6, wherein,
the acquiring of a trust level comprises:
transmitting a secret key provision request message when the node is installed, for acquiring a trust level equal to or higher than a predetermined trust level within a predetermined time; and
when the transmission of the secret key provision request message is completed, transferring the secret key map within a certain time, and
the secret key map is transferred within a predetermined time.

13. The key managing method of claim 6, wherein the updating of trust comprises:
changing the transmitted secret key map of the node with time; and
notifying changed content of the secret key map transmitted to the correspondent node.

14. The key managing method of claim 6, wherein the updating of trust comprises transmitting a secret key map, which is not transmitted by the node, to the correspondent node, updating the transmitted secret key map, and transferring the updated secret key map to the correspondent node.

* * * * *